United States Patent Office

3,411,047
Patented Nov. 12, 1968

3,411,047
TWO DIRECT CURRENT OUTPUT THREE PHASE RECTIFIER
Alfred Dickens Baker, Solihull, and Frank Grenville Hudman, Sutton Coldfield, England, assignors to Joseph Lucas (Industries) Limited, Birmingham, England, a British company
Filed Oct. 4, 1965, Ser. No. 492,544
Claims priority, application Great Britain, Oct. 14, 1964, 41,859/64
4 Claims. (Cl. 317—233)

ABSTRACT OF THE DISCLOSURE

A three phase rectifier having two separate direct current outputs formed by a set of three conductive members extending in the same direction with a set of three diodes supported on each member with each set of diodes having the same type terminal connected to each respective conductive member. The set of diodes on two of the conductive members having the same type terminals connected thereto and the third set having the opposite type terminals connected to its supporting conductive member. A second set of three conductive members extending transversely of the first mentioned conductive members, with each of the second set conductive members connected to the terminal of a separate diode of each set of diodes which terminal is not connected to a first set conductive member. Each of the second set of conductive members being adapted to be connected to a different phase of a three phase supply and each of the two first set conductive members connected to the same type diode terminals forming one terminal of a separate direct current output, while the third member thereof forms a common other terminal for both D.C. outputs.

---

This invention relates to full wave bridge rectifiers.

A rectifier according to the invention comprises in combination an insulating carrier member, a set of conductive members equal in number to the number of phases of an alternating current supply to be rectified, said set of conductive members being engaged with said carrier member, a pair of conductive members extending transversely relative to the set of conductive members and engaged with said carrier member, and a number of semi-conductor diodes equal to twice the number of phases, the diodes being supported between said set of members and said pair of members in such a way that when the conductive members in said set are connected to the phases of the alternating current supply respectively, a rectified supply will appear across the said pair of conductive members.

Figure 1:
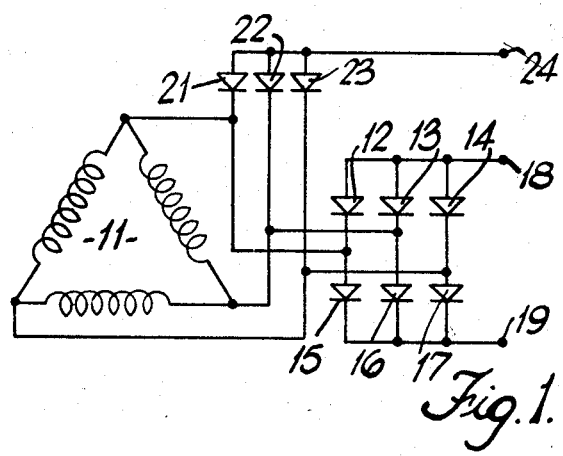
Figure 2:
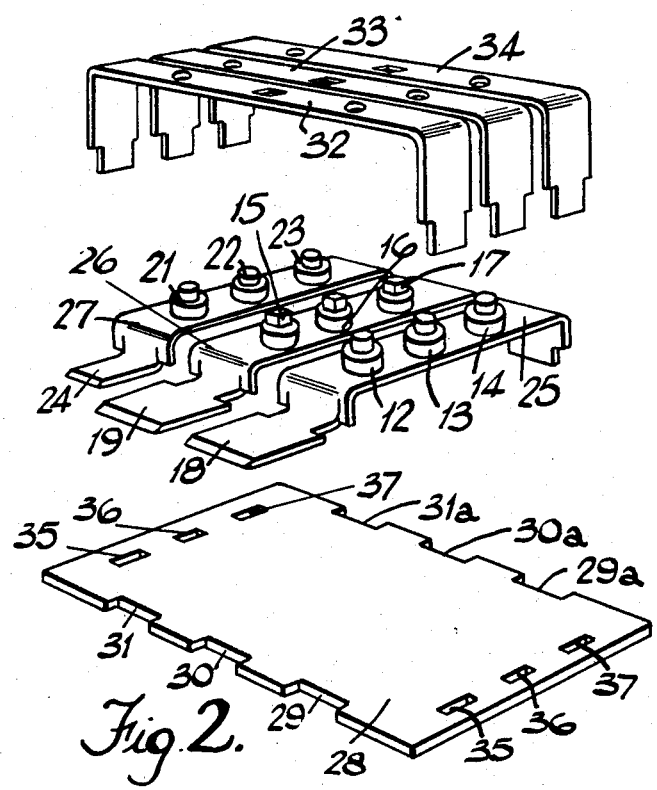
Figure 3:
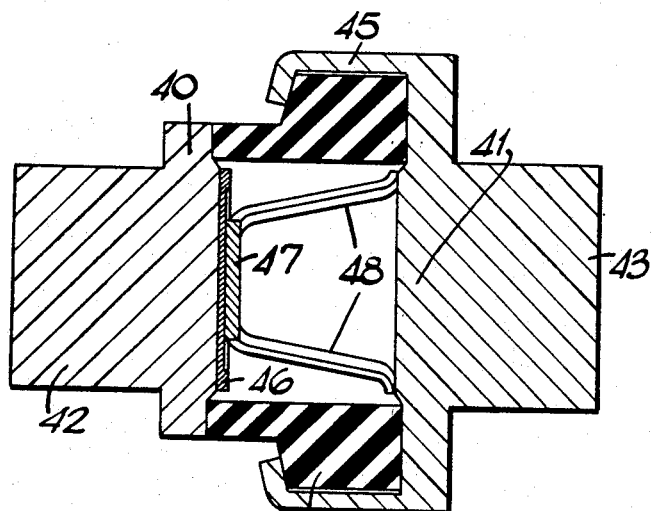

In the accompanying drawings, FIGURE 1 is a circuit diagram of an alternator and associated rectifier assembly to which the invention can be applied, FIGURE 2 is an exploded view of one example of the invention, and FIGURE 3 is a sectional side view illustrating the preferred form of diode assembly.

Referring to FIGURE 1, a three-phase alternator 11, which is shown delta connected but could be star connected, has its phase points connected to the cathodes of three diodes 12, 13, 14 and to the anodes of three diodes 15, 16, 17. The anodes of the diodes 12, 13, 14 are connected to a terminal 18, and the cathodes of the diodes 15, 16, 17 are connected to a terminal 19. In use, the alternator is driven by a road vehicle the battery of which is connected across the terminals 18, 19. The phase points are further connected through the cathode-anode paths of three further diodes 21, 22, 23 respectively to a terminal 24 by way of which current is supplied to the alternator field winding under the control of a voltage regulator.

FIGURE 2 shows an arrangement whereby the diodes in the full wave rectifier and the three additional diodes are mounted in a path which can be connected to the alternator casing. In FIGURE 2, use is made of diode assemblies which will be described with reference to FIGURE 3. These assemblies are indicated by the same reference numerals as in FIGURE 1, and it should be noted that each assembly has one end of circular cross-section constituting the cathode and one end of non-circular cross-section constituting the anode.

Referring to FIGURE 2, there are provided first, second and third conductive members 25, 26, 27 each comprising a strip which at one end is stepped to provide a shoulder between the main portion of the strip and an end portion, the end portions constituting the terminals 18, 19, 24 respectively. The strips are engaged with an insulating carrier 28 which is of rectangular form and is provided along one pair of parallel side edges with pairs of aligned notches 29a, 29b, 30a, 30b and 31a, 31b. The notches 29a, 30a, and 31a receive the shoulder portions of the strips, and the notches 29b, 30b, and 31b receive downwardly extending portions at the other ends of the members 25, 26, 27 so that the three conductive members are supported by the carrier 28 in spaced, parallel relationship.

The diodes 12, 13, 14 are carried by the member 25 with their anodes connected to the member 25. Similarly the diodes 15, 16, 17 are carried by the member 26 with their cathodes connected thereto, and the diodes 21, 22, 23 are carried by, and have their anodes connected to the member 27.

Extending transversely over the members 25, 26, 27 in spaced, parallel relationship are three bridge members 32, 33, 34 of generally U-shape having their end portions engaged within pairs of aligned holes 35, 36, 37 formed in the carrier 28. The bridge member 32 has formed therein three holes which engage the cathode projections of the diodes 12, 21 and the anode projection of the diode 12. Similarly, the member 33 is connected to the appropriate projections of the diodes 22, 16, 13 and the member 34 is connected to the appropriate projections at the diodes 23, 17, 14. In this way, the carrier 28 together with the parts supported thereon forms a unit which can be inserted in an alternator. If the three phases of the alternator are now connected to the three bridge members, a rectified output will appear between the terminals 18, 19 and the terminal 24 will provide the required input for the field winding.

Referring to FIGURE 3, the preferred diode assembly includes a pair of discs 40, 41 formed from metal and held in spaced relationship to each other by a body part 44 formed from electrically insulating material. The discs 40, 41 are provided with integral and outwardly extending projections 42, 43 respectively and the body part is hollow. Each disc is secured to the body part by a pair of diametrically disposed hook-shaped arms 45, which, during manufacture of the assembly, are turned over to bear against inclined surfaces on the body part, and the pairs of arms on the discs are disposed at 90° relative to each other so as to avoid the risk of direct electrical contact between the discs.

Within the hollow body part is located a rectifier element 46 formed from semi-conductive material and having opposite conductivity regions formtd therein. Conveniently the element is secured, as by soldering, to a machined face on the disc 40 and this serves to provide an electrical connection to one conductivity region of the element. The other region of the element is electrically connected to the disc 41 by a metal bridge piece which comprises a base portion 47 from which extend integral and resilient legs 48 the free ends of which bear against the disc 41. In use, besides ensuring the electrical connection to the disc 41 the legs also accommodate expansion which occurs owing to the heating of the element.

Conveniently the base portion 47 of the bridge piece is soldered to the element 46. As explained, in order to facilitate identification of the polarity of the discs 40, 41 the projections 12, 13 are of different cross-sectional shape and in the particular example the projection 42 is of circular section whilst the projection 43 is of square section. Furthermore, the body part is formed from alumina or alternatively beryllium oxide so as to have high thermal conductivity.

The example described is suitable for use where the terminal 19 is to be earthed, but where the terminal 18 is to be earthed, the diodes 21, 22, 23 have their anodes connected to the phase points and their cathode connnected to the terminal 24.

Having thus described our invention what we claim as new and desire to secure by Letters Patent is:

1. A full wave bridge rectifier for providing two direct current outputs from a three phase alternating current input, comprising a first set of three conductive members extending in the same direction, a set of three diodes supported on each first set conductive member, each diode having a cathode terminal and an anode terminal, each set of three diodes on a given first set conductive member having the same type terminal conductively connected thereto and the other type terminal unconnected thereto, diodes on two of the first set conductive members having the same type terminals connected to their respective first set supporting conductive members and diodes on the third of the first set conductive members having the opposite type terminals connected thereto, a second set of three conductive members extending transversely relative to said first set of conductive members, each of said second set of conductive members being connected to said first set unconnected terminal of a separate diode of each set of said diodes, means for connecting a separate phase of a three phase supply to each of said second set of conductive members, said two members of said first set of conducting members having the same type diode terminals connected thereto each forming one terminal of a separate direct current output and said third of the first set conductive members forming a common other terminal for both of said direct current outputs.

2. A full wave bridge rectifier as defined in claim 1 wherein an insulating carrier member is provided and on which both sets of conductive members are mounted.

3. A full wave bridge rectifier as defined in claim 1 wherein said diode terminals connected to the two first set conductive members having the same type diode terminals connected thereto are the anode terminals and said diode terminals connected to said third first set conductive member are the cathode terminals.

4. A full wave bridge rectifier as defined in claim 1 wherein said two first set conductive members having the same type diode terminals connected thereto are the outer conductive members and said third first set conductive member is the intermediate member.

References Cited

UNITED STATES PATENTS

| | | | |
|---|---|---|---|
| 2,215,667 | 9/1940 | Sherman | 317—234 |
| 2,501,331 | 3/1950 | Hein | 317—234 |

JAMES D. KALLAM, *Primary Examiner.*